United States Patent
D'Innocenzo et al.

(10) Patent No.: US 11,893,373 B2
(45) Date of Patent: Feb. 6, 2024

(54) EXPOSURE AND DE-DUPLICATION OF INPUT PARAMETERS FOR COMPLEX HELM CHART DEPLOYMENT

(71) Applicant: MICROSOFT TECHNOLOGY LICENSING, LLC, Redmond, WA (US)

(72) Inventors: Frank John D'Innocenzo, Groton, MA (US); Kam Yee Lee, Bolton, MA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 87 days.

(21) Appl. No.: 17/588,182

(22) Filed: Jan. 28, 2022

(65) Prior Publication Data
US 2023/0142198 A1    May 11, 2023

Related U.S. Application Data (60) Provisional application No. 63/276,100, filed on Nov. 5, 2021.

(51) Int. Cl.
*G06F 8/61*          (2018.01)
*G06F 16/174*        (2019.01)

(52) U.S. Cl.
CPC ............ *G06F 8/61* (2013.01); *G06F 16/1748* (2019.01)

(58) Field of Classification Search
CPC .............................. G06F 8/61; G06F 16/1748
See application file for complete search history.

(56) References Cited

U.S. PATENT DOCUMENTS

| | | | | |
|---|---|---|---|---|
| 10,547,590 | B1 * | 1/2020 | Matthews | H04L 45/745 |
| 11,086,725 | B2 * | 8/2021 | Alluboyina | G06F 11/1464 |
| 11,121,921 | B2 * | 9/2021 | Parker | G06F 9/542 |
| 11,194,791 | B1 * | 12/2021 | Baine | G06F 16/2379 |

(Continued)

FOREIGN PATENT DOCUMENTS

| | | | | |
|---|---|---|---|---|
| CN | 107315586 A | * | 11/2017 | G06F 8/61 |
| CN | 111142881 A | * | 5/2020 | G06F 8/60 |

(Continued)

OTHER PUBLICATIONS

Railić et al., "Architecting Continuous Integration and Continuous Deployment for Microservice Architecture", Mar. 2021, IEEE (Year: 2021).*

(Continued)

*Primary Examiner* — Wei Y Zhen
*Assistant Examiner* — Junchun Wu
(74) *Attorney, Agent, or Firm* — Newport IP, LLC; Han K. Gim (57) ABSTRACT

Techniques are disclosed for deploying functions in a cloud computing environment. Parameters are annotated in a plurality of Helm charts with a predetermined token. Duplicated values in the Helm charts are identified and the predetermined token is reused for the duplicated values. Schema files from the plurality of Helm charts are parsed to extract the predetermined tokens. Input data are received as values for the predetermined tokens. The function is deployed in the cloud computing environment using the values for the predetermined tokens as parameters in the Helm charts.

18 Claims, 9 Drawing Sheets

(56) References Cited

U.S. PATENT DOCUMENTS

| | | | | |
|---|---|---|---|---|
| 11,271,895 B1* | 3/2022 | Vallala | | H04L 41/0803 |
| 2014/0279949 A1* | 9/2014 | Koushik | | G06F 16/1748 |
| | | | | 707/692 |
| 2019/0102157 A1* | 4/2019 | Caldato | | G06F 11/362 |
| 2019/0340261 A1* | 11/2019 | Jain | | G06F 16/122 |
| 2019/0354354 A1* | 11/2019 | Dubinskii | | G06F 11/3466 |
| 2021/0208974 A1* | 7/2021 | Balcha | | G06F 9/45558 |
| 2022/0131852 A1* | 4/2022 | Sharma | | H04L 63/0815 |
| 2022/0391186 A1* | 12/2022 | Jain | | G06F 8/61 |

FOREIGN PATENT DOCUMENTS

| | | | | | |
|---|---|---|---|---|---|
| CN | 111813420 | A | * | 10/2020 | ......... G06F 11/3006 |
| CN | 113312083 | A | * | 8/2021 | ............... G06F 8/71 |
| CN | 113568764 | A | * | 10/2021 | |
| CN | 112286628 | B | * | 5/2022 | ............. G06F 16/23 |
| CN | 110048907 | B | * | 12/2022 | |
| WO | WO-2021234586 | A1 | * | 11/2021 | |

OTHER PUBLICATIONS

Gokhale et al., "Creating Helm Charts to ease deployment of Enterprise Application and its related Services in Kubernetes", Sep. 2021, IEEE (Year: 2021).*
Buchanan et al., "Helm Charts for Azure Kubernetes Service", 2020, Springer (Year: 2020).*
Erickson, "Log-Data Visualization Tool for Analyzing and Improving Performance of Data De-Duplication Tool in Charm-II", 2011, Utah State University (Year: 2011).*

* cited by examiner

EXPOSURE AND DE-DUPLICATION OF INPUT PARAMETERS FOR COMPLEX HELM CHART DEPLOYMENT

PRIORITY APPLICATION

This application claims the benefit of and priority to U.S. Provisional Application No. 63/276,100, filed Nov. 5, 2021, the entire contents of which are incorporated herein by reference.

BACKGROUND

Many service providers provide computing services to businesses and individuals as a remote computing service or provide "software as a service" (e.g., cloud computing). To facilitate efficient utilization of data center resources, virtualization technologies allow a physical computing device to host one or more virtual machines or containers that appear and operate as independent computing resources. The data center can create, maintain or delete virtual machines or containers in a dynamic manner. Many platforms use Kubernetes as a container orchestration system for application deployment, scaling, and management. Helm charts are often used to define configurations for a given deployment. It is with respect to these considerations and others that the disclosure made herein is presented.

SUMMARY

Currently, the input data required to deploy a complex application in a Kubernetes environment includes potentially hundreds of parameters, many of which are duplicated amongst a plurality of services. This can result in a daunting deployment process. Helm is one tool that can be used to manage the deployment process. Helm is a Kubernetes operations and package manager that can be used to define releases into a Helm chart. A Helm chart can contain Kubernetes objects and resources and are typically used to deploy an application. However, in a complex cloud-native microservice-based system, there is a need for a user-friendly way of deploying services that include a large number of parameters. For complex systems, Helm charts often require many unique parameters, some of which are duplicated across a set of charts.

The present disclosure provides a method to expose a minimal set of parameters for complex cloud native applications in a single form, while de-duplicating common parameters to greatly simplify deployment. By providing such a way to simplify Helm chart deployment, service providers and networks may operate more efficiently, providing for greater operational efficiency for service providers.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DRAWINGS

The Detailed Description is described with reference to the accompanying figures. In the description detailed herein, references are made to the accompanying drawings that form a part hereof, and that show, by way of illustration, specific embodiments or examples. The drawings herein are not drawn to scale. Like numerals represent like elements throughout the several figures.

DETAILED DESCRIPTION

Cloud native applications can include sets of complex services deployed in functional groups of microservices. Each function typically requires customization of various input parameters to deploy the service. A typical orchestration strategy on a Kubernetes cluster includes the use of Helm charts which specify the Kubernetes resources to be deployed for a service. The more complicated the function, the more input data is required for the Helm chart. The more functions that are deployed, the more Helm charts are needed as well as more input data, which typically have duplicated data among the charts. In the description that follows, various embodiments are described for providing a minimal set of parameters for complex cloud native applications in a single form, while de-duplicating common parameters to greatly simplify deployment.

In various embodiments, Helm charts may be implemented that optionally include a schema file that describes every value that a user can set (whether optional or required) and can be enhanced to simplify workload deployment. In one embodiment, parameters that are required for a system to be deployed and do not typically include a default value are annotated with a meaningful token. As an example, the "exposedName" token is used, but it should be understood that any name can be used to identify values that are to be exposed. The "exposedName" token may be reused for duplicated values in all Helm charts that are required to deploy the system. The schema files from all the Helm charts may be parsed and the "exposedName" tokens may be extracted. A relationship map may be created (e.g., "exposedName"<->backend-value). This will be one to many. Customized input data for all "exposedName" values in the relationship map may be provided. The filled relationship map may be parsed and a Helm-values overlay file for each Helm chart may be output. The Helm charts may be deployed along with the generated values overlay.

Referring to the appended drawings, in which like numerals represent like elements throughout the several FIGURES, aspects of various technologies for improved Helm chart deployment will be described. In the following detailed description, references are made to the accompanying drawings that form a part hereof, and which are shown by way of illustration specific configurations or examples.

Figure 1:
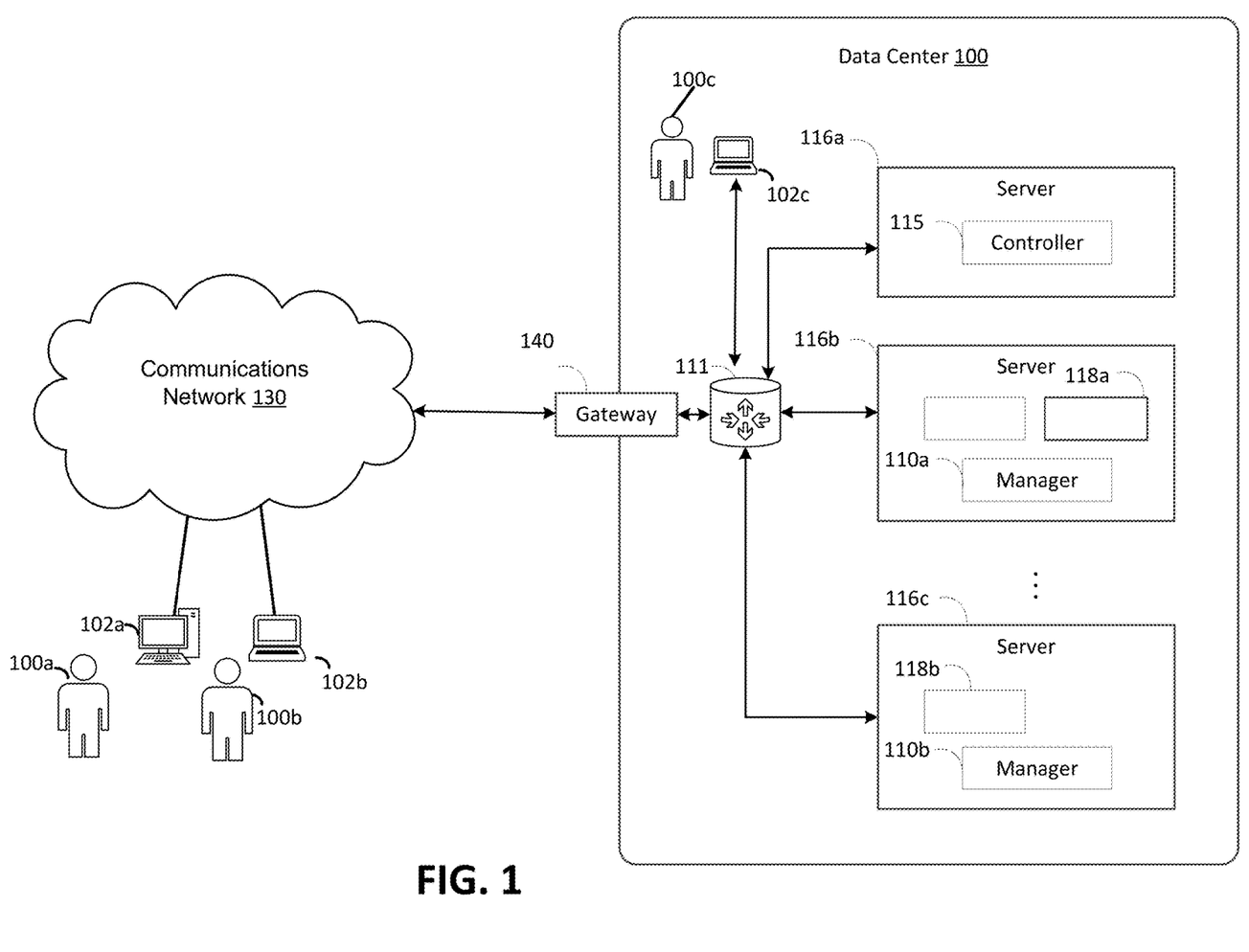
FIG. 1 is a diagram illustrating an example computing environment in accordance with the present disclosure.

FIG. 1 illustrates one example of a general computing environment in which the embodiments described herein may be implemented. FIG. 1 illustrates a data center 100 that is configured to provide computing resources to users 100a, 100b, or 100c (which may be referred herein singularly as "a user 100" or in the plural as "the users 100") via user computers 102a,102b, and 102c (which may be referred herein singularly as "a computer 102" or in the plural as "the computers 102") via a communications network 130. The computing resources provided by the data center 100 may include various types of resources, such as computing resources, data storage resources, data communication resources, and the like. Each type of computing resource may be general-purpose or may be available in a number of specific configurations. For example, computing resources may be available as virtual machines or containers. The virtual machines or containers may be configured to execute applications, including Web servers, application servers, media servers, database servers, and the like. Data storage resources may include file storage devices, block storage devices, and the like. Each type or configuration of computing resource may be available in different configurations, such as the number of processors, and size of memory and/or storage capacity. The resources may in some embodiments be offered to clients in units referred to as instances or containers, such as container instances, virtual machine instances, or storage instances. A virtual computing instance may be referred to as a virtual machine and may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

Data center 100 may include servers 116a, 116b, and 116c (which may be referred to herein singularly as "a server 116" or in the plural as "the servers 116") that provide computing resources available as virtual machines or containers 118a and 118b (which may be referred to herein singularly as "a virtual machine 118" or in the plural as "the virtual machines 118" or as "a container 118" or in the plural as "the containers 118"). The virtual machines or containers 118 may be configured to execute applications such as Web servers, application servers, media servers, database servers, and the like. Other resources that may be provided include data storage resources (not shown on FIG. 1) and may include file storage devices, block storage devices, and the like. Servers 116 may also execute functions that manage and control allocation of resources in the data center, such as a controller 115. Controller 115 may be a fabric controller or another type of program configured to manage the allocation of virtual machines or containers on servers 116.

Referring to FIG. 1, communications network 130 may, for example, be a publicly accessible network of linked networks and may be operated by various entities, such as the Internet. In other embodiments, communications network 130 may be a private network, such as a corporate network that is wholly or partially inaccessible to the public.

Communications network 130 may provide access to computers 102. Computers 102 may be computers utilized by users 100. Computer 102a,102b or 102c may be a server, a desktop or laptop personal computer, a tablet computer, a smartphone, a set-top box, or any other computing device capable of accessing data center 100. User computer 102a or 102b may connect directly to the Internet (e.g., via a cable modem). User computer 102c may be internal to the data center 100 and may connect directly to the resources in the data center 100 via internal networks. Although only three user computers 102a,102b, and 102c are depicted, it should be appreciated that there may be multiple user computers.

Computers 102 may also be utilized to configure aspects of the computing resources provided by data center 100. For example, data center 100 may provide a Web interface through which aspects of its operation may be configured through the use of a Web browser application program executing on user computer 102. Alternatively, a stand-alone application program executing on user computer 102 may be used to access an application programming interface (API) exposed by data center 100 for performing the configuration operations.

Servers 116 may be configured to provide the computing resources described above. One or more of the servers 116 may be configured to execute a manager 120a or 120b (which may be referred herein singularly as "a manager 120" or in the plural as "the managers 120") configured to execute the virtual machines. The managers 120 may be a virtual machine monitor (VMM), fabric controller, or another type of program configured to enable the execution of virtual machines or containers 118 on servers 116, for example.

It should be appreciated that although the embodiments disclosed above are discussed in the context of virtual machines and containers, other types of implementations can be utilized with the concepts and technologies disclosed herein.

In the example data center 100 shown in FIG. 1, a network device 111 may be utilized to interconnect the servers 116a and 116b. Network device 111 may comprise one or more switches, routers, or other network devices. Network device 111 may also be connected to gateway 140, which is connected to communications network 130. Network device 111 may facilitate communications within networks in data center 100, for example, by forwarding packets or other data communications as appropriate based on characteristics of such communications (e.g., header information including source and/or destination addresses, protocol identifiers, etc.) and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

It should be appreciated that the network topology illustrated in FIG. 1 has been greatly simplified and that many more networks and networking devices may be utilized to interconnect the various computing systems disclosed herein. These network topologies and devices should be apparent to those skilled in the art.

It should also be appreciated that data center 100 described in FIG. 1 is merely illustrative and that other implementations might be utilized. Additionally, it should be appreciated that the functionality disclosed herein might be implemented in software, hardware or a combination of software and hardware. Other implementations should be apparent to those skilled in the art. It should also be appreciated that a server, gateway, or other computing device may comprise any combination of hardware or software that can interact and perform the described types of functionality, including without limitation desktop or other computers, database servers, network storage devices and other network devices, PDAs, tablets, smartphone, Internet appliances, television-based systems (e.g., using set top boxes and/or personal/digital video recorders), and various other consumer products that include appropriate communication capabilities. In addition, the functionality provided by the illustrated modules may in some embodiments be combined in fewer modules or distributed in additional modules. Similarly, in some embodiments the functionality of some of the illustrated modules may not be provided and/or other additional functionality may be available.

In some embodiments, the present disclosure may be implemented in a mobile edge computing (MEC) environment implemented in conjunction with a 4G, 5G, or other cellular network. MEC is a type of edge computing that uses cellular networks and 5G and enables a data center to extend cloud services to local deployments using a distributed architecture that provide federated options for local and remote data and control management. MEC architectures may be implemented at cellular base stations or other edge nodes and enable operators to host content closer to the edge of the network, delivering high-bandwidth, low-latency applications to end users. For example, the cloud provider's footprint may be co-located at a carrier site (e.g., carrier data center), allowing for the edge infrastructure and applications to run closer to the end user via the 5G network. The MEC environment may include at least some of the components and functionality described in FIG. 1 above. Additionally, components of a 5G network may include network functions such as a Session Management Function (SMF), Policy Control Function (PCF), and N7 interface. A radio access network (RAN) may comprise 5G-capable UEs, a base station gNodeB that communicates with an Access and Mobility Management Function (AMF) in a 5G Core (5GC) network. The 5G network may further comprise a User Plane Function (UPF) and Policy Charging Function (PCF).

Figure 2:
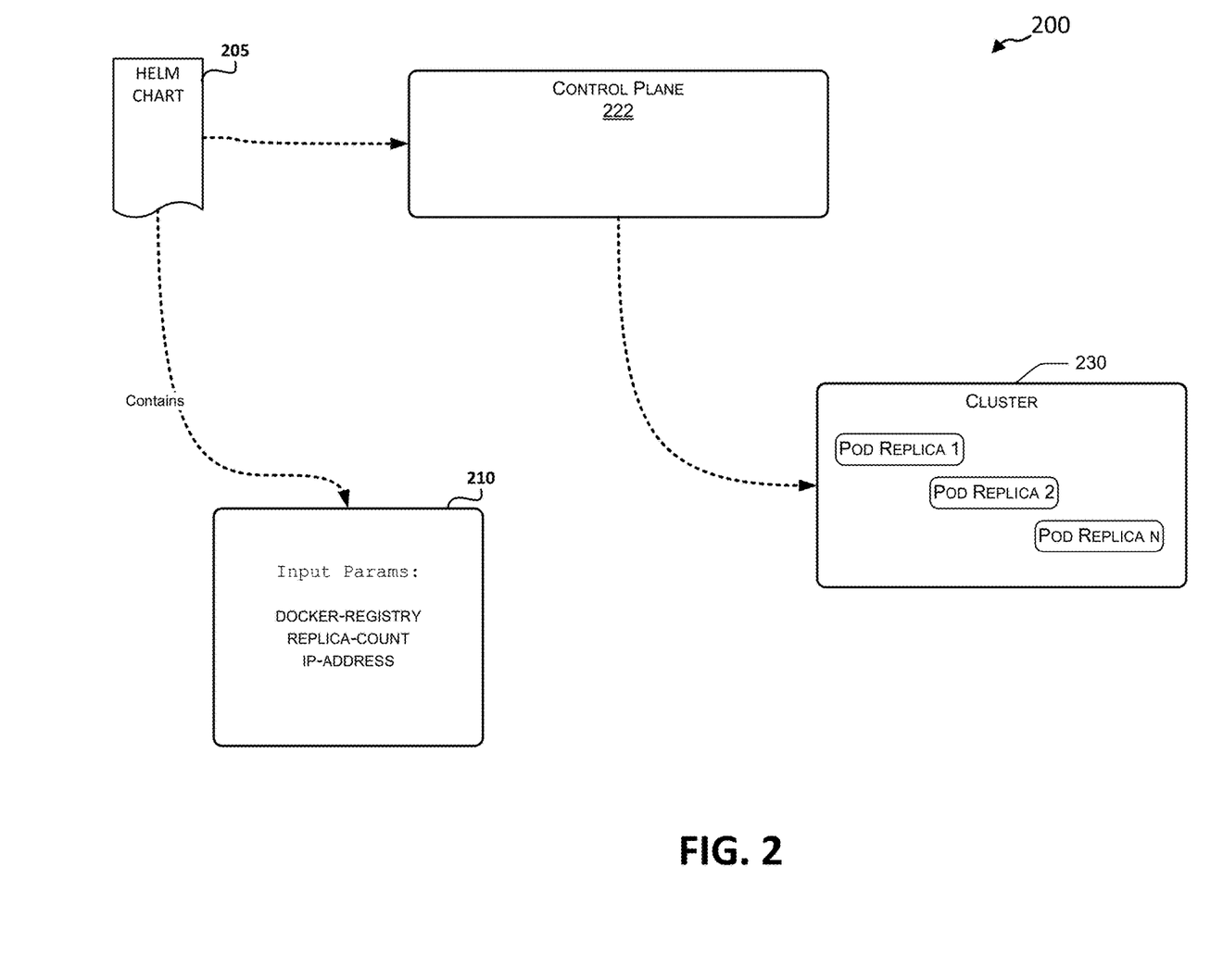
FIG. 2 illustrates an example of a Helm deployment in accordance with the present disclosure.

Referring to FIG. 2, illustrated is one example environment 200 where the disclosed techniques can be implemented. FIG. 2 illustrates a Kubernetes control plane 222 which is configured to receive and implement the desired state information for a deployment. In an embodiment, the files that describe the desired set of Kubernetes resources can be defined by a Helm chart 205 that contains input metadata 210. The control plane 222 may receive as input metadata including the API, entity URL or identifier, access credentials, desired states, and other information needed to deploy a service at cluster 230.

Figure 3:
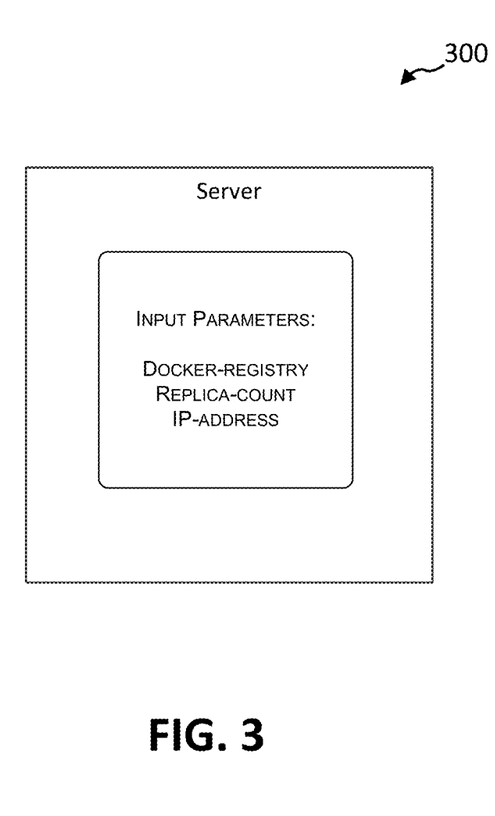
FIG. 3 is a flowchart depicting a simple deployment in a cloud computing environment in accordance with the present disclosure.

FIG. 3 illustrates a simple cloud service deployed with a minimal set of Helm parameters 300, which consists of a deployment (the microservice) and a service to expose an IP address. The amount of input data is limited and there is no duplication of parameters. This is a simple service requiring three basic parameters to deploy. A simple Helm command line command may be used to deploy this service to provide a fully functional web server.

Figure 4:
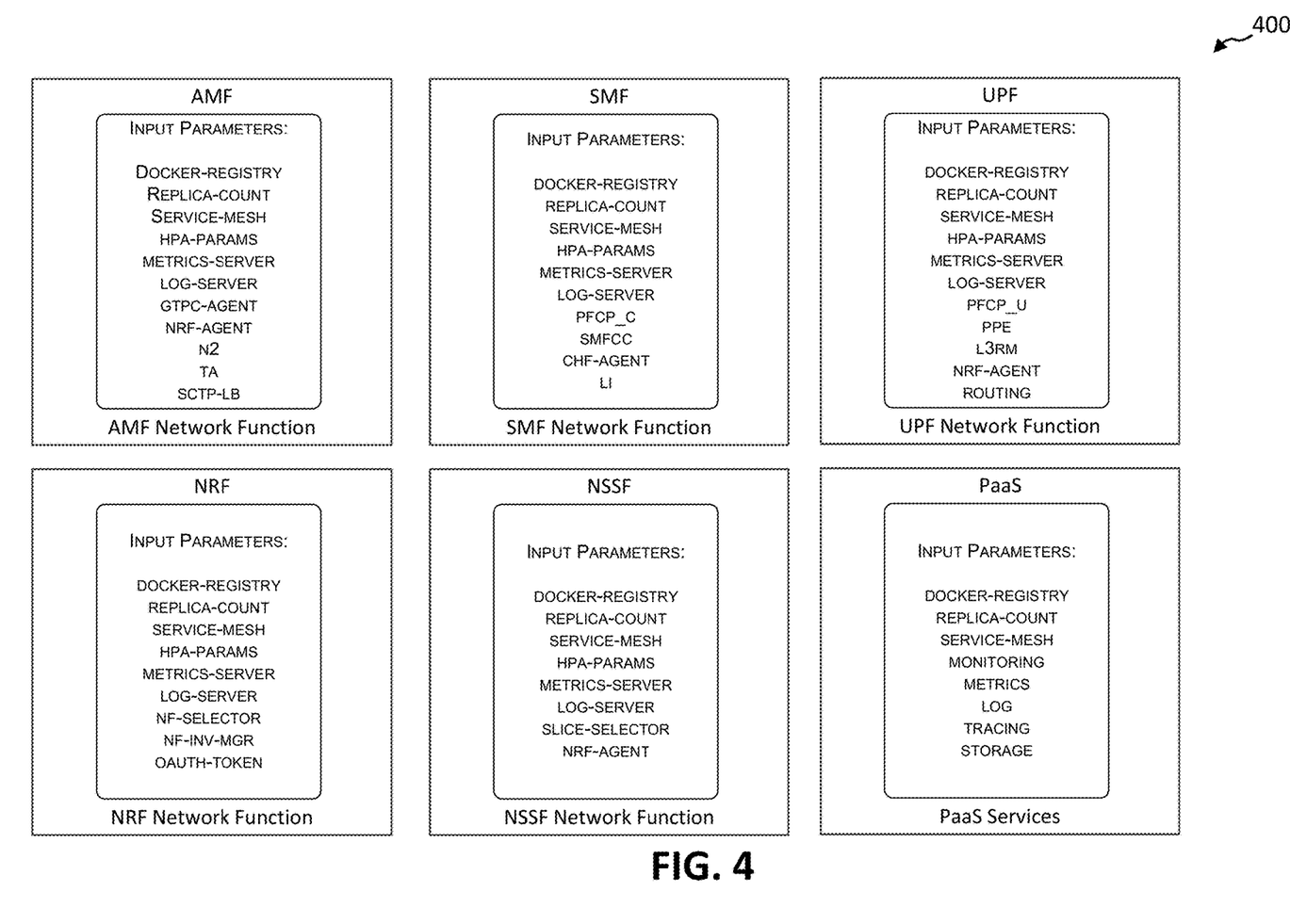
FIG. 4 is a flowchart depicting a complex deployment in a cloud computing environment in accordance with the present disclosure.

FIG. 4 illustrates the components of a 5G network deployed in a cloud environment via a complex set of Helm charts requiring a plurality of input parameters (including duplicated parameters for each chart). The figure illustrates some of the services required to deploy a 5G cloud infrastructure with each service requiring parameters where some of the parameters are duplicated. The illustrated services include Access and Mobility Management Function (AMF), Session Management Function (SMF), User Plane Function (UPF), Network Function Repository Function (NRF), Network Slice Selection Function (NSSF), and Platform-as-a-Service (PaaS). As shown in the Figure, some parameters are repeated such docker-registry and replica count, while others are unique for each function.

In such a complex cloud-native microservice-based system, there is currently not a user-friendly way of deploying services that include a large number of settable parameters. More specifically, there is not a way to deploy complex systems with one or more Helm charts each requiring many unique parameters, some of which may be duplicated across the set of charts.

Figure 5A:
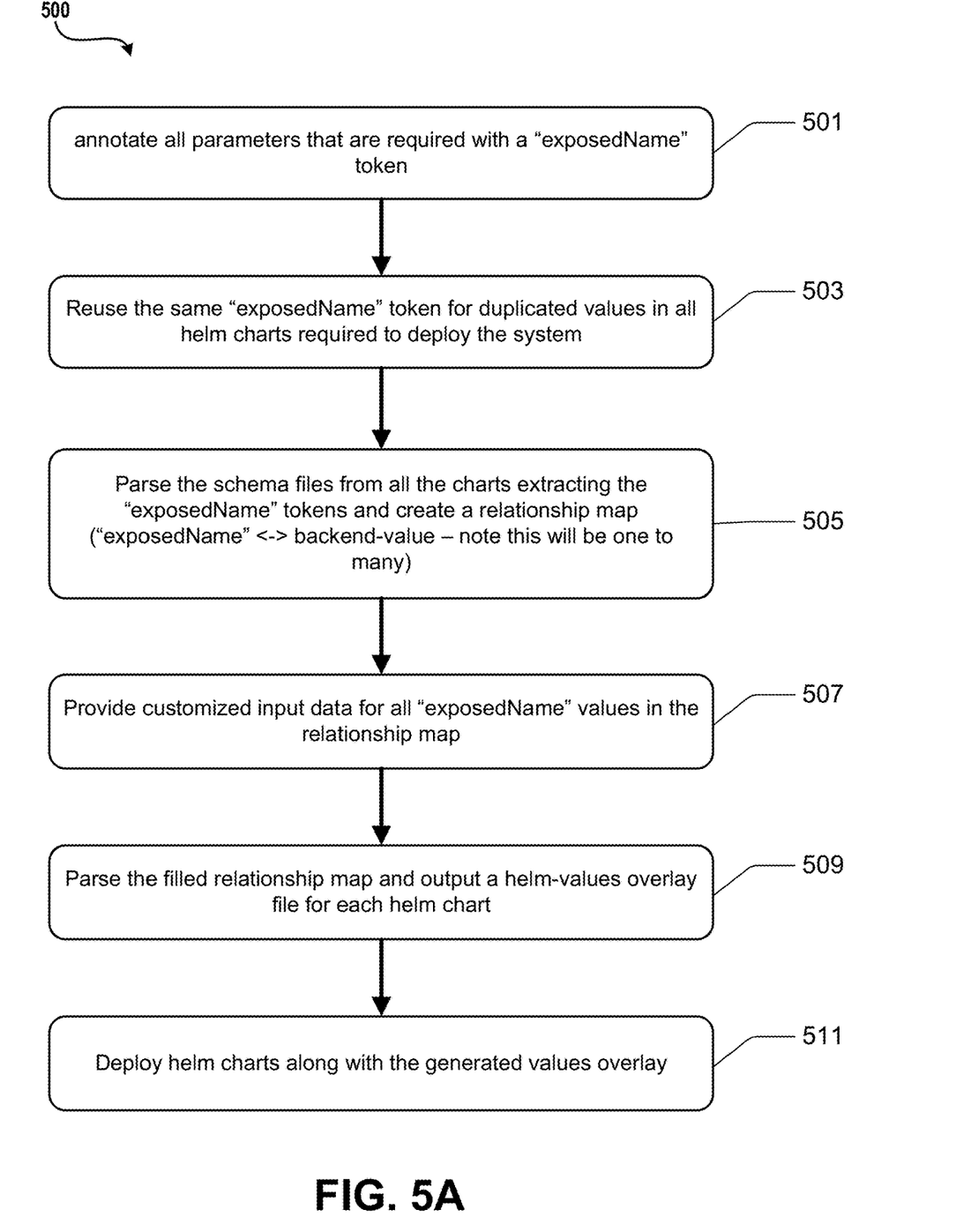
FIG. 5A is a flowchart depicting an example procedure in accordance with the present disclosure.

The disclosed embodiments provide a way to expose a minimal set of parameters in a single form as well as to de-duplicate the common parameters to simplify the deployment process. In one embodiment, Helm charts optionally include a schema file that describes every value that a user can set (whether optional or required) and can be enhanced to provide the following method to simplify workload deployment:

With reference to FIG. 5A, step 501 illustrates that all parameters that are required and do not typically include a default value are annotated with a meaningful token. In this example, the "exposedName" token is used, but it should be understood that any name can be used to identify values that are to be exposed.

Step 503 illustrates reusing the same "exposedName" token for duplicated values in all Helm charts required to deploy the system.

Step 505 illustrates parsing the schema files from all the charts, extracting the "exposedName" tokens, and creating a relationship map ("exposedName"<->backend-value—note this will be one to many).

Step 507 illustrates providing customized input data for all "exposedName" values in the relationship map.

Step 509 illustrates parsing the filled relationship map and outputting a Helm-values overlay file for each Helm chart.

Step 511 illustrates deploying Helm charts along with the generated values overlay.

Figure 5B:
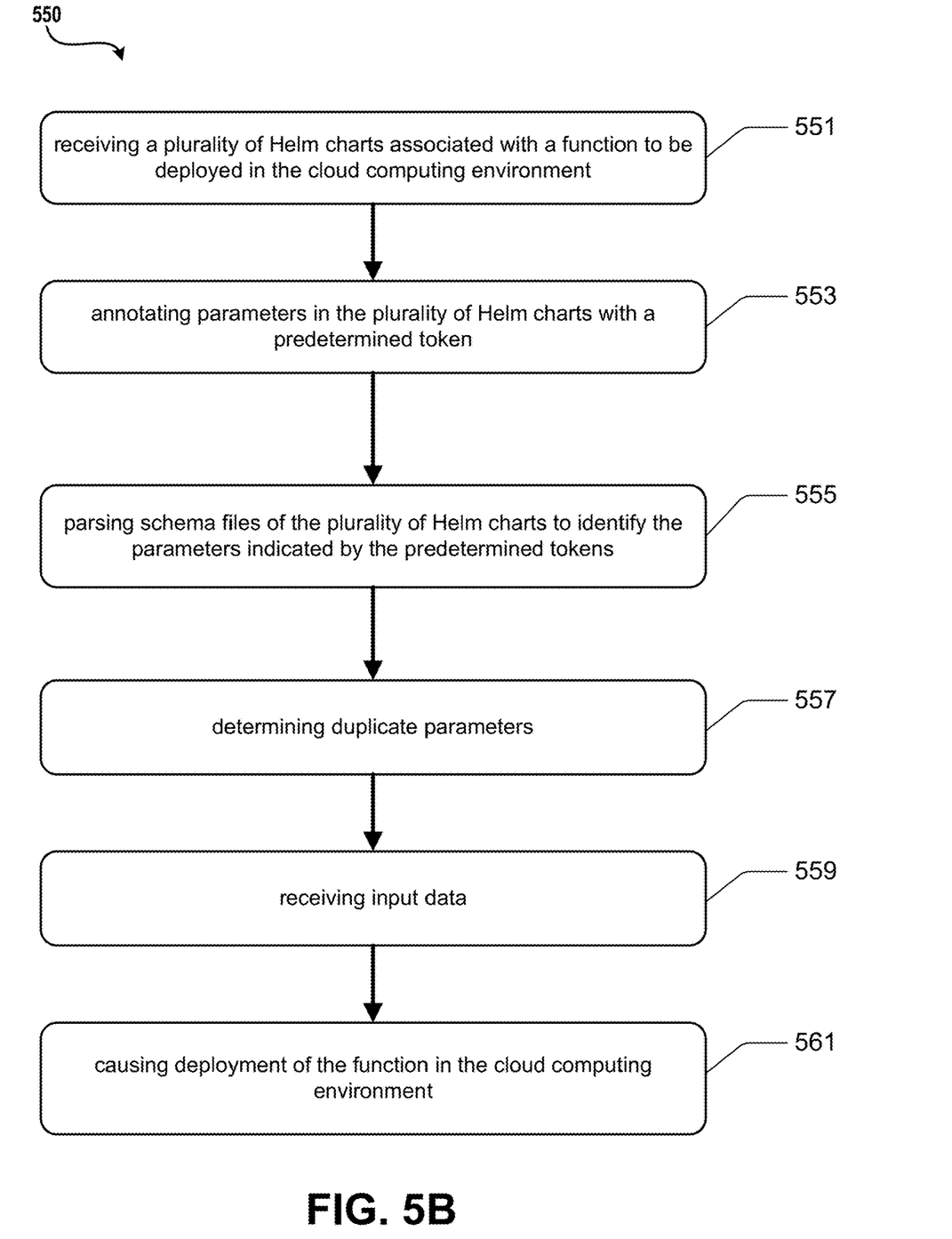
FIG. 5B is a flowchart depicting an example procedure in accordance with the present disclosure.

Turning now to FIG. 5B, illustrated is an example operational procedure for deploying functions in a Kubernetes-based cloud computing environment. In an embodiment, the cloud computing environment comprises a plurality of computing devices executing a plurality of computing devices executing a plurality of clusters comprising one or more containers, wherein deployment of functions in the cloud computing environment are orchestrated by a Kubernetes platform. Such an operational procedure can be provided by one or more components illustrated in FIG. 1 or 2. The operational procedure may be implemented in a system comprising one or more computing devices. It should be understood by those of ordinary skill in the art that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, performed together, and/or performed simultaneously, without departing from the scope of the appended claims.

It should also be understood that the illustrated methods can end at any time and need not be performed in their entireties. Some or all operations of the methods, and/or substantially equivalent operations, can be performed by execution of computer-readable instructions included on a computer-storage media, as defined herein. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

It should be appreciated that the logical operations described herein are implemented (1) as a sequence of computer implemented acts or program modules running on a computing system such as those described herein) and/or (2) as interconnected machine logic circuits or circuit modules within the computing system. The implementation is a matter of choice dependent on the performance and other requirements of the computing system. Accordingly, the logical operations may be implemented in software, in firmware, in special purpose digital logic, and any combination thereof. Thus, although the routine 300 is described as running on a system, it can be appreciated that the routine 300 and other operations described herein can be executed on an individual computing device or several devices.

Referring to FIG. 5B, operation 551 illustrates receiving, by a service running in the cloud computing environment, a plurality of Helm charts associated with a function to be deployed in the cloud computing environment. In an embodiment, the plurality of Helm charts comprises a schema file and a plurality of parameters defining deployment of the function in the cloud computing environment.

Operation 551 may be followed by operation 553. Operation 553 illustrates annotating individual ones of the plurality of parameters in the plurality of Helm charts with a predetermined token that indicates that an input value is required.

Operation 553 may be followed by operation 555. Operation 555 illustrates parsing the schema files of the plurality of Helm charts to identify the parameters indicated by the predetermined tokens.

Operation 555 may be followed by operation 557. Operation 557 illustrates determining duplicate parameters among the identified parameters.

Operation 557 may be followed by operation 559. Operation 559 illustrates receiving input data for the parameters indicated by the predetermined tokens. In an embodiment, input data for the duplicate parameters are received as single entries that are mapped to the duplicate parameters.

Operation 559 may be followed by operation 561. Operation 561 illustrates causing deployment of the function in the cloud computing environment by the Kubernetes platform. In an embodiment, the deployment is based on the plurality of Helm charts. In an embodiment, values for the plurality of parameters include the single entries mapped to the duplicated parameters.

Figure 5C:
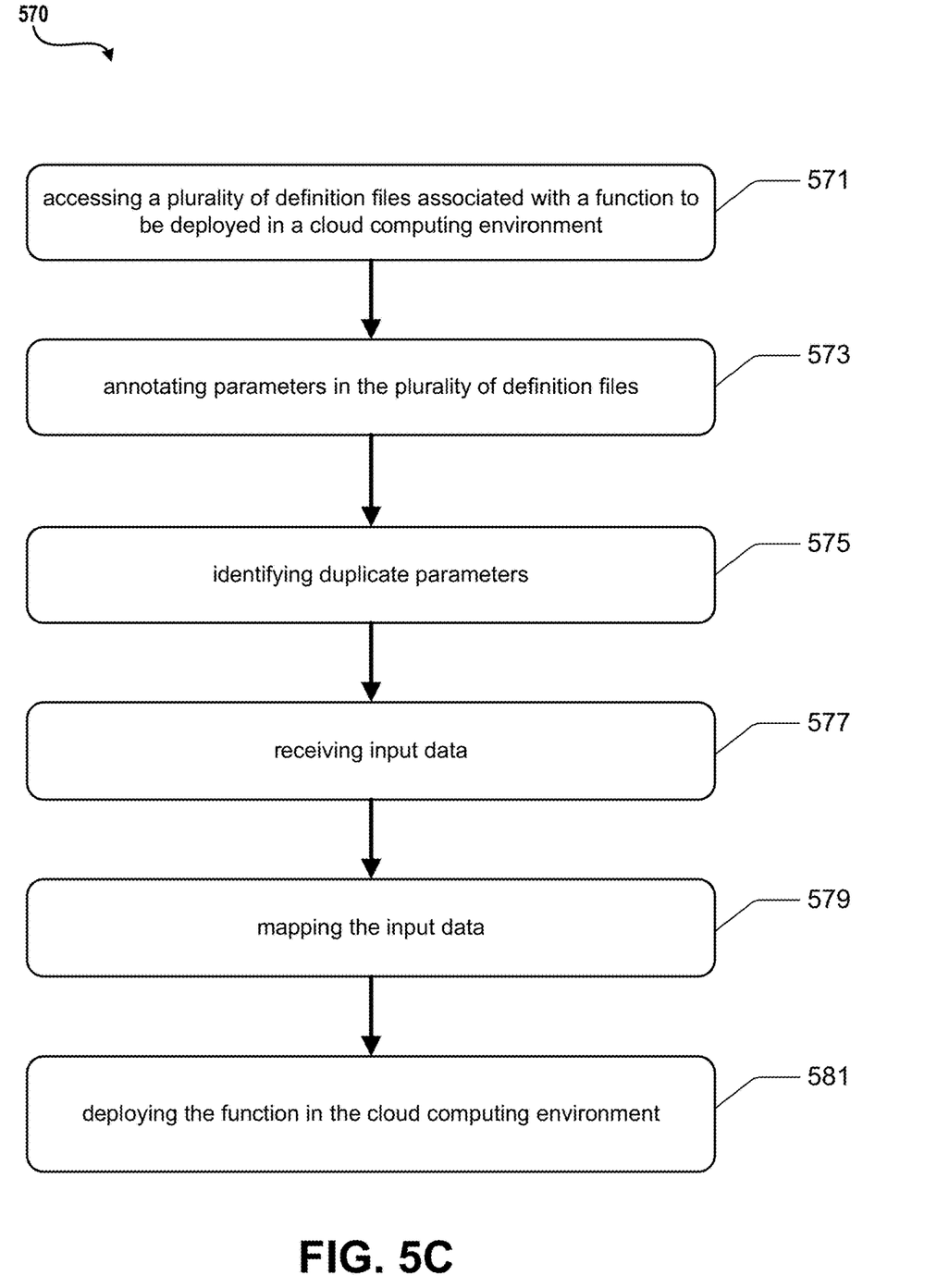
FIG. 5C is a flowchart depicting an example procedure in accordance with the present disclosure.

Referring to FIG. 5C, illustrated is another example operational procedure for deploying functions in a cloud computing environment. Such an operational procedure may be provided by components and features shown in FIG. 1 or 2. The operational procedure may be implemented in a system comprising one or more computing devices.

Referring to FIG. 5C, operation 571 illustrates accessing a plurality of definition files associated with a function to be deployed in a cloud computing environment, wherein the deployment is managed by an orchestration platform.

Operation 571 may be followed by operation 573. Operation 573 illustrates annotating parameters in the plurality of definition files that require an input value.

Operation 573 may be followed by operation 575. Operation 575 illustrates identifying duplicate parameters among the annotated parameters.

Operation 575 may be followed by operation 577. Operation 577 illustrates receiving input data for the annotated parameters.

Operation 577 may be followed by operation 579. Operation 579 illustrates mapping the input data to the annotated parameters, wherein the mapping is one-to-many for the duplicate parameters.

Operation 579 may be followed by operation 581. Operation 581 illustrates deploying the function in the cloud computing environment using the mapped input data.

Figure 6:
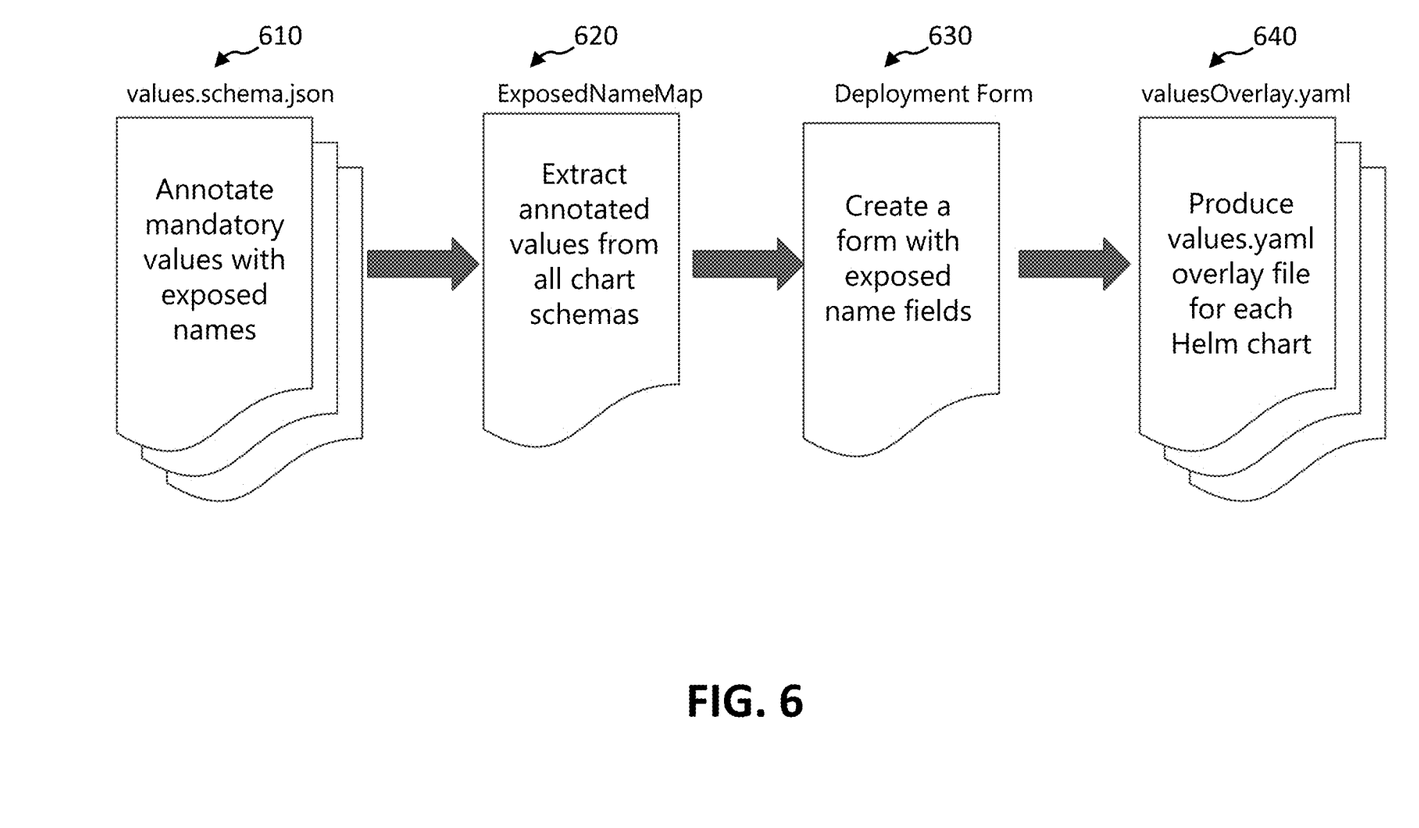
FIG. 6 is a flowchart depicting an example procedure in accordance with the present disclosure.

FIG. 6 illustrates one example of a simplified deployment workflow in accordance with the disclosed embodiments. 610 illustrates values.schema.json which annotates mandatory values (from all charts) with exposed (or common) names. Mandatory values may be any parameter that must be set (does not typically have a default and is required).

620 illustrates ExposedName Map which extracts annotated values from all chart schemas, producing a mapping between exposedName and backend values path.

630 illustrates a deployment form which creates a "fill in the blanks" form with all exposedName fields for the user to supply input data. Various methods may be implemented to provide and present the form to the user and to receive user selections, such as a graphical user interface, command-line interface, text document, and the like.

640 illustrates valuesOverlay.yaml which is a values.yaml overlay file for each Helm chart based on input data from the deployment form and exposedName mapping.

The describe methods and procedures may be implemented in a cloud computing environment comprising a plurality of computing devices executing a plurality of Kubernetes clusters comprising one or more containers. Such an operational procedure can be provided by one or more components illustrated in FIGS. 1 and 2. It should be understood by those of ordinary skill in the art that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, performed together, and/or performed simultaneously, without departing from the scope of the appended claims.

It should also be understood that the illustrated methods can end at any time and need not be performed in their entireties. Some or all operations of the methods, and/or substantially equivalent operations, can be performed by execution of computer-readable instructions included on a computer-storage media, as defined herein. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

It should be appreciated that the logical operations described herein are implemented (1) as a sequence of computer implemented acts or program modules running on a computing system such as those described herein) and/or (2) as interconnected machine logic circuits or circuit modules within the computing system. The implementation is a matter of choice dependent on the performance and other requirements of the computing system. Accordingly, the logical operations may be implemented in software, in firmware, in special purpose digital logic, and any combination thereof. Thus, although the routine 300 is described as running on a system, it can be appreciated that the routine 300 and other operations described herein can be executed on an individual computing device or several devices.

Those skilled in the art will also appreciate that the subject matter described herein may be practiced on or in conjunction with other computer system configurations beyond those described herein, including multiprocessor systems. The embodiments described herein may also be practiced in distributed computing environments, where tasks are performed by remote processing devices that are linked through a communications network. In a distributed computing environment, program modules may be located in both local and remote memory storage devices.

Networks established by or on behalf of a user to provide one or more services (such as various types of cloud-based computing or storage) accessible via the Internet and/or other networks to a distributed set of clients may be referred to as a service provider. Such a network may include one or more data centers such as data center 100 illustrated in FIG. 1, which are configured to host physical and/or virtualized computer servers, storage devices, networking equipment and the like, that may be used to implement and distribute the infrastructure and services offered by the service provider.

Figure 7:
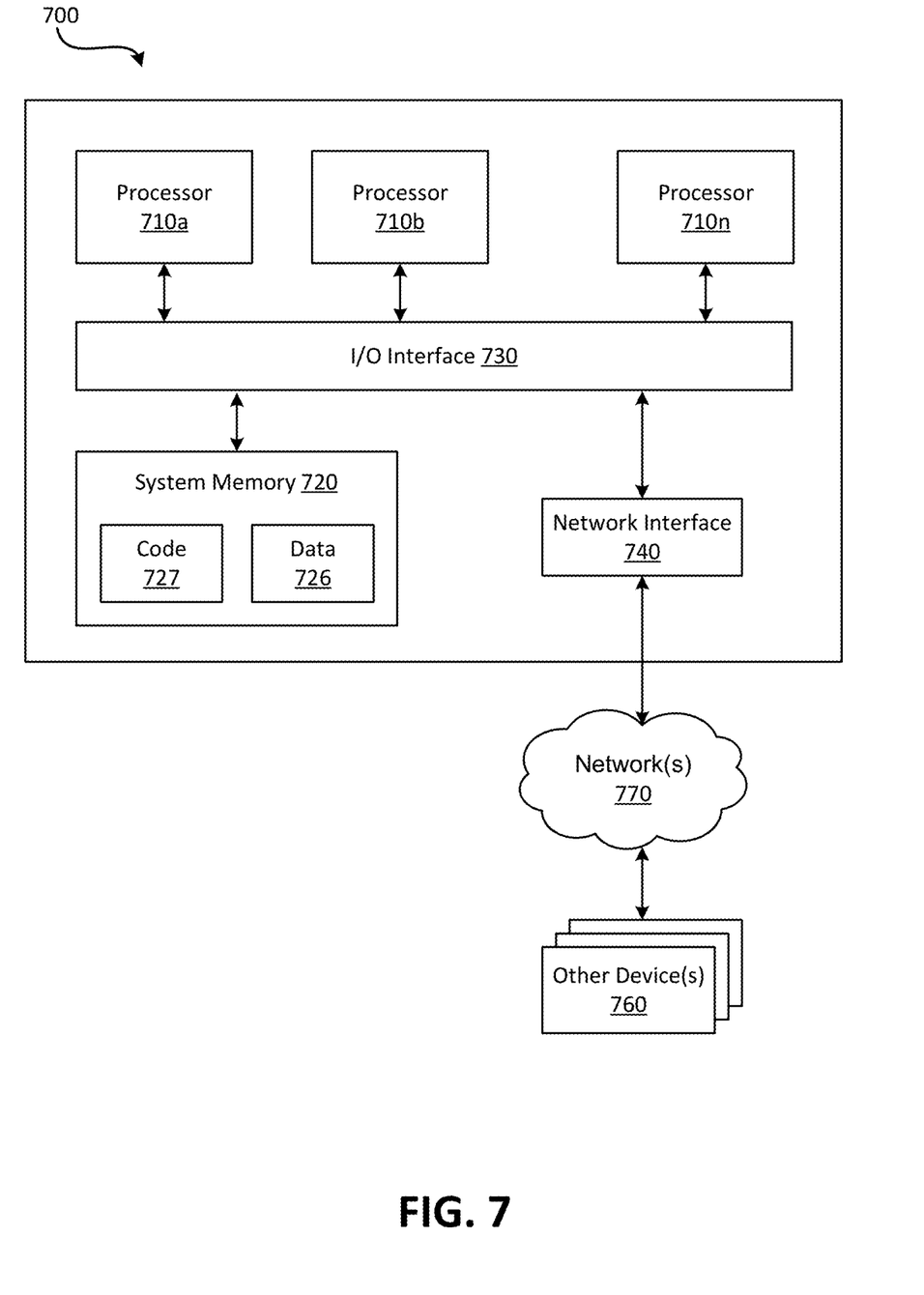
FIG. 7 is an example computing device in accordance with the present disclosure.

In some embodiments, a server that implements a portion or all of one or more of the technologies described herein, including the techniques to implement the capturing of network traffic may include a general-purpose computer system that includes or is configured to access one or more computer-accessible media. FIG. 7 illustrates such a general-purpose computing device 700. In the illustrated embodiment, computing device 700 includes one or more processors 710*a*, 710*b*, and/or 710*n* (which may be referred herein singularly as "a processor 710" or in the plural as "the processors 710") coupled to a system memory 720 via an input/output (I/O) interface 730. Computing device 700 further includes a network interface 740 coupled to I/O interface 730.

In various embodiments, computing device 700 may be a uniprocessor system including one processor 710 or a multiprocessor system including several processors 710 (e.g., two, four, eight, or another suitable number). Processors 710 may be any suitable processors capable of executing instructions. For example, in various embodiments, processors 710 may be general-purpose or embedded processors implementing any of a variety of instruction set architectures (ISAs), such as the x76, PowerPC, SPARC, or MIPS ISAs, or any other suitable ISA. In multiprocessor systems, each of processors 710 may commonly, but not necessarily, implement the same ISA.

System memory 720 may be configured to store instructions and data accessible by processor(s) 710. In various embodiments, system memory 720 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques and data described above, are shown stored within system memory 720 as code 727 and data 726.

In one embodiment, I/O interface 730 may be configured to coordinate I/O traffic between the processor 710, system memory 720, and any peripheral devices in the device, including network interface 740 or other peripheral interfaces. In some embodiments, I/O interface 730 may perform any necessary protocol, timing, or other data transformations to convert data signals from one component (e.g., system memory 720) into a format suitable for use by another component (e.g., processor 710). In some embodiments, I/O interface 730 may include support for devices attached through various types of peripheral buses, such as a variant of the Peripheral Component Interconnect (PCI) bus standard or the Universal Serial Bus (USB) standard, for example. In some embodiments, the function of I/O interface 730 may be split into two or more separate components. Also, in some embodiments some or all of the functionality of I/O interface 730, such as an interface to system memory 720, may be incorporated directly into processor 710.

Network interface 740 may be configured to allow data to be exchanged between computing device 700 and other device or devices 760 attached to a network or network(s) 770, such as other computer systems or devices as illustrated in FIGS. 1 through 4, for example. In various embodiments, network interface 740 may support communication via any suitable wired or wireless general data networks, such as types of Ethernet networks, for example. Additionally, network interface 740 may support communication via telecommunications/telephony networks such as analog voice networks or digital fiber communications networks, via storage area networks such as Fibre Channel SANs or via any other suitable type of network and/or protocol.

In some embodiments, system memory 720 may be one embodiment of a computer-accessible medium configured to store program instructions and data as described above for FIGS. 1-6 for implementing embodiments of the corresponding methods and apparatus. However, in other embodiments, program instructions and/or data may be received, sent or stored upon different types of computer-accessible media. A computer-accessible medium may include non-transitory storage media or memory media, such as magnetic or optical media, e.g., disk or DVD/CD coupled to computing device 700 via I/O interface 730. A non-transitory computer-accessible storage medium may also include any volatile or non-volatile media, such as RAM (e.g. SDRAM, DDR SDRAM, RDRAM, SRAM, etc.), ROM, etc., that may be included in some embodiments of computing device 700 as system memory 720 or another type of memory. Further, a computer-accessible medium may include transmission media or signals such as electrical, electromagnetic or digital signals, conveyed via a communication medium such as a network and/or a wireless link, such as may be implemented via network interface 740. Portions or all of multiple computing devices, such as those illustrated in FIG. 7, may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device," as used herein, refers to at least all these types of devices and is not limited to these types of devices.

Various storage devices and their associated computer-readable media provide non-volatile storage for the computing devices described herein. Computer-readable media as discussed herein may refer to a mass storage device, such as a solid-state drive, a hard disk or CD-ROM drive. However, it should be appreciated by those skilled in the art that computer-readable media can be any available computer storage media that can be accessed by a computing device.

By way of example, and not limitation, computer storage media may include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computing devices discussed herein. For purposes of the claims, the phrase "computer storage medium," "computer-readable storage medium" and variations thereof, does not include waves, signals, and/or other transitory and/or intangible communication media, per se.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the disclosed computing devices in order to store and execute the software components and/or functionality presented herein. It is also contemplated that the disclosed computing devices may not include all of the illustrated components shown in FIG. 7, may include other components that are not explicitly shown in FIG. 7, or may utilize an architecture completely different than that shown in FIG. 7.

Although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without author input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While certain example embodiments have been described, these embodiments have been presented by way of example only, and are not intended to limit the scope of the inventions disclosed herein. For example, the example embodiments are described in the context of Kubernetes platforms and Helm charts, the described techniques can be implemented in other deployment platforms and using other types of input files. Nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

It should be appreciated any reference to "first," "second," etc. items and/or abstract concepts within the description is not intended to and should not be construed to necessarily correspond to any reference of "first," "second," etc. elements of the claims. In particular, within this Summary and/or the following Detailed Description, items and/or abstract concepts such as, for example, individual computing devices and/or operational states of the computing cluster may be distinguished by numerical designations without such designations corresponding to the claims or even other paragraphs of the Summary and/or Detailed Description. For example, any designation of a "first operational state" and "second operational state" of the computing cluster within a paragraph of this disclosure is used solely to distinguish two different operational states of the computing cluster within that specific paragraph—not any other paragraph and particularly not the claims.

In closing, although the various techniques have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

The disclosure presented herein also encompasses the subject matter set forth in the following clauses:

Clause 1: A method for deploying functions in a cloud computing environment, the cloud computing environment comprising a plurality of computing devices executing a plurality of containers, wherein deployment of functions in the cloud computing environment is orchestrated by a Kubernetes platform, the method comprising:

receiving, by a service running in the cloud computing environment, a plurality of Helm charts associated with a function to be deployed in the cloud computing environment, the plurality of Helm charts comprising a schema file and a plurality of parameters defining deployment of the function in the cloud computing environment;

annotating individual ones of the plurality of parameters in the plurality of Helm charts with a predetermined token that indicates that an input value is required;

parsing the schema files of the plurality of Helm charts to identify the parameters indicated by the predetermined tokens;

determining duplicate parameters among the identified parameters;

receiving input data for the parameters indicated by the predetermined tokens, wherein:

input data for the duplicate parameters are received as single entries that are mapped to the duplicate parameters; and causing deployment of the function in the cloud computing environment by the Kubernetes platform, the deployment based on the plurality of Helm charts, wherein values for the plurality of parameters include the single entries mapped to the duplicated parameters.

Clause 2: The method of clause 1, wherein the parameters that are annotated are parameters that do not include a default value.

Clause 3: The method of any of clauses 1-2, further comprising generating a relationship map based on the identified parameters.

Clause 4: The method of any of clauses 1-3, wherein the received input data is for predetermined token values in the relationship map.

Clause 5: The method of any of clauses 1-4, further comprising:

parsing the relationship map and generating a Helm-values overlay file for each of the plurality of Helm charts; and deploying the Helm charts with the generated overlay file to cause deployment of the function in the cloud computing environment.

Clause 6: The method of any of clauses 1-5, wherein the input data is received via one or more forms rendered in a user interface.

Clause 7: The method of any of clauses 1-6, wherein the input data is received via one or more text files.

Clause 8: The method of any of clauses 1-7, wherein the input data is received via a command-line interface.

Clause 9: A system, comprising:

one or more data processing units;

a computer-readable medium having encoded thereon computer-executable instructions to cause the one or more data processing units to perform operations comprising:

accessing a plurality of definition files associated with a function to be deployed in a cloud computing environment, wherein the deployment is managed by an orchestration platform;

annotating parameters in the plurality of definition files that require an input value;

identifying duplicate parameters among the annotated parameters;

receiving input data for the annotated parameters;

mapping the input data to the annotated parameters, wherein the mapping is one-to-many for the duplicate parameters; and deploying the function in the cloud computing environment using the mapped input data.

Clause 10: The system of clause 9, wherein the parameters that are annotated are parameters that are required for the deployment and do not include a default value.

Clause 11: The system of any of clauses 9 and 10, further comprising generating a relationship map based on the annotated parameters.

Clause 12: The system of any of clauses 9-11, wherein the parameters are annotated using a predetermined token.

Clause 13: The system of any clauses 9-12, further comprising:

parsing the relationship map and generating an overlay file for each of the plurality of definition files; and using the definition files with the generated overlay file to cause the deployment of the function in the cloud computing environment.

Clause 14: The system of any clauses 9-13, wherein the input data is received via one or more forms rendered in a user interface.

Clause 15: The system of any clauses 9-14, wherein the input data is received via one or more text files.

Clause 16: A computer-readable storage medium having computer-executable instructions stored thereupon which, when executed by one or more processors of a computing device, cause the computing device to perform operations comprising:

accessing a plurality of input files associated with a function to be deployed in a cloud computing environment, wherein the deployment is orchestrated using a cloud computing orchestration platform;

annotating parameters in the plurality of input files that require an input value;

parsing the plurality of input files to identify the annotated parameters;

determining duplicate parameters among the identified parameters;

receiving input data as values for the identified parameters, wherein input data for the duplicate parameters are received as single entries that are mapped to the duplicate parameters; and deploying the function in the cloud computing environment using the input values.

Clause 17: The computer-readable storage medium of clause 16, further comprising generating a relationship map based on the single entries.

Clause 18: The computer-readable storage medium of any of clauses 16 and 17, wherein the parameters are annotated using a predetermined token.

Clause 19: The computer-readable storage medium of any of the clauses 16-18, further comprising:

parsing the relationship map to generate an overlay file for each of the plurality of input files; and using the input files with the generated overlay file to cause the deployment of the function in the cloud computing environment.

Clause 20: The computer-readable storage medium of any of the clauses 16-19, wherein the input data is received via one of forms rendered in a user interface, text files, or a command-line interface.

What is claimed is:

1. A method for deploying functions in a cloud computing environment, the cloud computing environment comprising a plurality of computing devices executing a plurality of containers, wherein deployment of functions in the cloud computing environment is orchestrated by a Kubernetes platform, the method comprising:

receiving, by a service running in the cloud computing environment, a plurality of Helm charts associated with a function to be deployed in the cloud computing environment, the plurality of Helm charts comprising a schema file and a plurality of parameters defining deployment of the function in the cloud computing environment;

annotating individual ones of the plurality of parameters in the plurality of Helm charts with a predetermined token that indicates that an input value is required;

parsing the schema files of the plurality of Helm charts to identify the parameters indicated by the predetermined tokens;

determining duplicate parameters among the identified parameters;

receiving input data for the parameters indicated by the predetermined tokens, wherein:

input data for the duplicate parameters are received as single entries that are mapped to the duplicate parameters; and causing deployment of the function in the cloud computing environment by the Kubernetes platform, the deployment based on the plurality of Helm charts, wherein values for the plurality of parameters include the single entries mapped to the duplicated parameters.

2. The method of claim 1, wherein the parameters that are annotated are parameters that do not include a default value.

3. The method of claim 1, further comprising generating a relationship map based on the identified parameters.

4. The method of claim 3, wherein the received input data is for predetermined token values in the relationship map.

5. The method of claim 3, further comprising:
parsing the relationship map and generating a Helm-values overlay file for each of the plurality of Helm charts; and
deploying the Helm charts with the generated overlay file to cause deployment of the function in the cloud computing environment.

6. The method of claim 1, wherein the input data is received via one or more forms rendered in a user interface.

7. The method of claim 1, wherein the input data is received via one or more text files.

8. The method of claim 1, wherein the input data is received via a command-line interface.

9. A system, comprising:
one or more data processing units;
a computer-readable medium having encoded thereon computer-executable instructions to cause the one or more data processing units to perform operations comprising:
accessing a plurality of Helm charts associated with a function to be deployed in a cloud computing environment, wherein the deployment is managed by an orchestration platform;
annotating parameters in the plurality of Helm charts with a predetermined token that indicates that an input value is required;
identifying duplicate parameters among the annotated parameters;
receiving input data for the annotated parameters, wherein input data for the duplicate parameters are received as single entries that are mapped to the duplicate parameters;
mapping the input data to the annotated parameters, wherein the mapping is one-to-many for the duplicate parameters; and
deploying the function in the cloud computing environment using the mapped input data.

10. The system of claim 9, wherein the parameters that are annotated are parameters that are required for the deployment and do not include a default value.

11. The system of claim 9, further comprising generating a relationship map based on the annotated parameters.

12. The system of claim 11, further comprising:
parsing the relationship map and generating an overlay file for each of the plurality of Helm charts; and
using the Helm charts with the generated overlay file to cause the deployment of the function in the cloud computing environment.

13. The system of claim 9, wherein the input data is received via one or more forms rendered in a user interface.

14. The system of claim 9, wherein the input data is received via one or more text files.

15. A computer-readable storage medium having computer-executable instructions stored thereupon which, when executed by one or more processors of a computing device, cause the computing device to perform operations comprising:
accessing a plurality of Helm charts associated with a function to be deployed in a cloud computing environment, wherein the deployment is orchestrated using a cloud computing orchestration platform;
annotating parameters in the plurality of Helm charts with a predetermined token that indicates that an input value is required;
parsing the plurality of Helm charts to identify the annotated parameters;
determining duplicate parameters among the identified parameters;
receiving input data as values for the identified parameters, wherein input data for the duplicate parameters are received as single entries that are mapped to the duplicate parameters;
mapping the input data to the annotated parameters, wherein the mapping is one-to-many for the duplicate parameters; and
deploying the function in the cloud computing environment using the input values.

16. The computer-readable storage medium of claim 15, further comprising generating a relationship map based on the single entries.

17. The computer-readable storage medium of claim 16, further comprising:
parsing the relationship map to generate an overlay file for each of the plurality of Helm charts; and
using the Helm charts with the generated overlay file to cause the deployment of the function in the cloud computing environment.

18. The computer-readable storage medium of claim 17, wherein the input data is received via one of forms rendered in a user interface, text files, or a command-line interface.

* * * * *